(12) United States Patent
Lee

(10) Patent No.: US 7,643,437 B2
(45) Date of Patent: Jan. 5, 2010

(54) HALF-DUPLEX TERMINAL FOR DISPLAYING HOLDING TIME AND COMMUNICATION METHOD THEREFOR

(75) Inventor: Byoung-Chul Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 602 days.

(21) Appl. No.: 11/356,623

(22) Filed: Feb. 17, 2006

(65) Prior Publication Data

US 2006/0250995 A1 Nov. 9, 2006

(30) Foreign Application Priority Data

May 4, 2005 (KR) .................. 10-2005-0037664

(51) Int. Cl.
*H04L 5/16* (2006.01)
(52) U.S. Cl. .................. 370/276; 455/518
(58) Field of Classification Search ......... 370/276–296; 455/73–88; 348/14.01, 14.02
See application file for complete search history.

(56) References Cited

U.S. PATENT DOCUMENTS

| 4,181,887 | A | * | 1/1980 | Place ............. 340/7.42 |
| 6,714,795 | B1 | | 3/2004 | Long et al. |
| 6,845,103 | B1 | * | 1/2005 | Park ............. 370/430 |
| 6,944,687 | B2 | * | 9/2005 | Doragh et al. ............. 710/46 |
| 7,133,398 | B2 | * | 11/2006 | Allen et al. ............. 370/350 |
| 7,457,624 | B2 | * | 11/2008 | Shinoda ............. 455/440 |
| 2002/0089965 | A1 | * | 7/2002 | Kim ............. 370/342 |
| 2002/0177461 | A1 | | 11/2002 | Rosen et al. |
| 2004/0203793 | A1 | | 10/2004 | Dorenbosch |
| 2006/0114314 | A1 | * | 6/2006 | Dunko ............. 348/14.1 |

FOREIGN PATENT DOCUMENTS

KR 10-2004-64833 7/2004

* cited by examiner

*Primary Examiner*—William Trost, IV
*Assistant Examiner*—Charles C Jiang
(74) *Attorney, Agent, or Firm*—The Farrell Law Firm, LLP

(57) ABSTRACT

A half-duplex terminal for displaying a holding time and a communication method therefor are provided. In the half-duplex terminal, a transmitter/receiver transmits/receives data and an acknowledgement (ACK) signal, a push-to-X (PTX) key is activated for data transmission/reception, a timer counts time upon pressing of the PTX key, a display displays a total holding time and a controller controls calculation of the total holding time based on the time count, display and counting down of the total holding time.

6 Claims, 6 Drawing Sheets

HALF-DUPLEX TERMINAL FOR DISPLAYING HOLDING TIME AND COMMUNICATION METHOD THEREFOR

PRIORITY

This application claims priority under 35 U.S.C. § 119 to an application entitled "Half-Duplex Terminal For Displaying Holding Time And Communication Method Therefor" filed in the Korean Intellectual Property Office on May 4, 2005 and assigned Serial No. 2005-37664, the contents of which are fully incorporated herein by reference.

BACKGROUND OF THE INVENTION

1. Field of the Invention

The present invention relates to a half-duplex terminal for displaying a holding time and a communication method therefor, the half-duplex terminal having a transmitter/receiver for transmitting/receiving data and an acknowledgement (ACK) signal, a Push-To-X (PTX) key for activating data transmission/reception, a timer for counting time upon pressing of the PTX key, a display for displaying a total holding time and a controller for controlling calculation of the total holding time based on the time count, and display and counting down of the total holding time.

2. Description of the Related Art

Push-To-Talk (PTT) is an instant messenger service that allows a user to use a phone handset much like a traditional radio-based walkie-talkie. As implied from its name, the PTT service provides communication to the user with the touch of a PTT button. Compared to a traditional mobile phone, a PTT phone has a shorter connection time, thereby providing faster communication service.

The user can talk to many people simultaneously by making a PTT group call. The user who presses the PTT button first is able to speak with his/her handset while the remaining persons in the group can listen to the user with their handsets, unlike a normal phone where the user can speak to only one person at a time. With the PTT service, the user can launch either one-on-one or group conversations.

The current trend is for mobile terminals to operate over packet networks, and to instantly indicate whether reception is available to the other party through a screen.

PTT is based on half-duplex technology. A major example of half-duplex applications is a walkie-talkie. In view of the nature of the PTT service, once a call session is established, communication can only travel in one direction at a particular time. Therefore, if another person in the group wants to join the conversation, that person must wait until the current speaker stops talking. Time delay is inherent to the PTT service, because one must recognize that someone else has begun speaking. During the time delay period, many persons may attempt PTT transmission simultaneously. In this case, although their terminals send the transmission attempts to a PTT server, the PTT server sends an ACK message to the person whose terminal sent packets first in order to enable him/her PTT transmission, while sending non-acknowledgement (NACK) signals to the other users to prohibit them from transmitting PTT signals. In this fashion, the PTT service prevents many people from speaking at the same time.

A typical PTT call procedure will be described below with reference to FIG. 1. FIG. 1 is a diagram illustrating a signal flow over time for a PTT call.

Referring to FIG. 1, a first terminal 100 (terminal #1) sends PTT data 106 in packets D01 to D03 to a second terminal 104 (terminal #2) via a PTT server 102. The second terminal 104 then outputs the received PTT data 106. A transmission time delay 108 and a decoding time delay 110 exist until the PTT data 106 is output from the second terminal 104.

The second terminal 104 sends a reply 114 for the PTT data 106 in packets A01 to A03 to the first terminal 100 via the PTT server 102. A reply time delay 112 occurs before the reply transmission.

The first terminal 100 is held for a total holding time 116 between transmission of the PTT data 106 and reception of the reply 114.

As illustrated in FIG. 1, a PTT call is a semi-bidirectional communication. A total holding time elapses until a person receives a reply from a recipient of voice packets after he/she finishes speaking. The total holding time is the sum of a transmission time for voice packets to arrive at the receiving terminal via the PTT server, a decoding time for the receiving terminal to decode and output the PTT packets through a speaker, the time for the recipient to decide what to say before pressing the PTT button to reply, the time for voice packets as a reply to be transferred from the receiving terminal to the transmitting terminal via the PTT server, and the time for the transmitting terminal to decode the voice packets. If the total holding time is too long, the speaker is likely to determine that the recipient has made no reply; therefore, the speaker may attempt the same PTT transmission. Also, when excessive time is taken to decode PTT packets at the receiving terminal, during which the speaker attempts another PTT transmission, the recipient must inconveniently wait until he/she receives the same message and is authorized to reply. This problem will be addressed below with reference to FIG. 2.

FIG. 2 is a diagram illustrating a signal flow when a reply is cancelled at a PTT call.

Referring to FIG. 2, the first terminal 100 sends the PTT data 106 in the packets D01 to D03 to the second terminal 104 via the PTT server 102. The second terminal 104 then outputs the received PTT data 106. The transmission time delay 108 and the decoding time delay 110 elapse until the PTT data 106 is output from the second terminal 104.

If the first terminal 100 sends retransmission PTT data 200 without receiving the reply 114 for the PTT data 106 and the second terminal 104 receives the retransmission PTT data 200 before the packets A01 and A02 of the reply 114 arrive at the first terminal 100, the PTT server 102 cancels the transmission of the reply packets A01 and A02 and sends a retransmission packet D04 to the second terminal 104. The second terminal 104 cancels the reply 114 and outputs the retransmission data 200.

This problem is exacerbated under a weak electric field or a bad propagation condition.

SUMMARY OF THE INVENTION

An object of the present invention is to substantially solve at least the above problems and/or disadvantages and to provide at least the advantages below. Accordingly, an object of the present invention is to provide an apparatus and method for displaying a holding time for a reply in half-duplex communications.

The above and other objects are achieved by providing a half-duplex terminal for displaying a holding time and a communication method therefore.

According to one aspect of the present invention, in a half-duplex terminal for displaying a holding time, a transmitter/receiver transmits/receives data and an ACK signal, a PTX key is activated for data transmission/reception, a timer counts time upon pressing of the PTX key, a display displays a total holding time, and a controller controls calculation of the total holding time based on the time count, display and counting down of the total holding time.

According to another aspect of the present invention, in a method of displaying a holding time in a half-duplex terminal, time is counted when data transmission starts, it is determined whether an ACK signal has been received, the time counting is ended upon receipt of the ACK signal, the data transmission is completed and the holding time is calculated and counted down.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity.

The present invention provides an apparatus and method for displaying a holding time in half-duplex communications including PTT for voice communication, Push-To-View (PTV) for communication by images and moving pictures and Push-To-All (PTA) for communication by multimedia data. This apparatus is termed a push-to-X (PTX) terminal in the following description of the present invention.

The PTX terminal is applicable to half-duplex communications including PTT, PTV and PTA. The PTX terminal will be described below in the context of PTT.

A PTX terminal for displaying a holding time in half-duplex communications will be described below with reference to FIG. 3.

Figure 1:
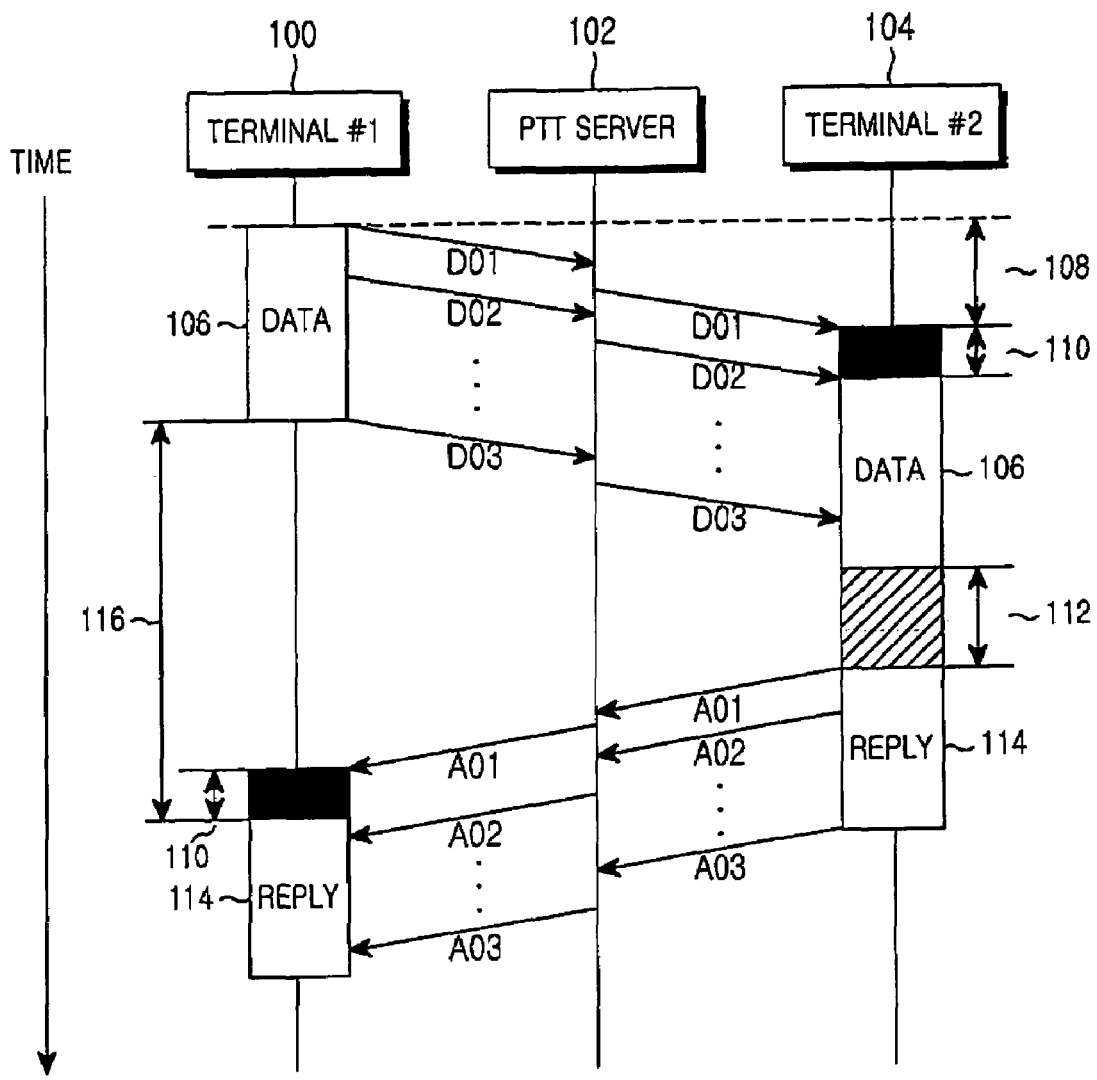
FIG. 1 is a diagram illustrating a signal flow over time for a PTT call.
Figure 2:
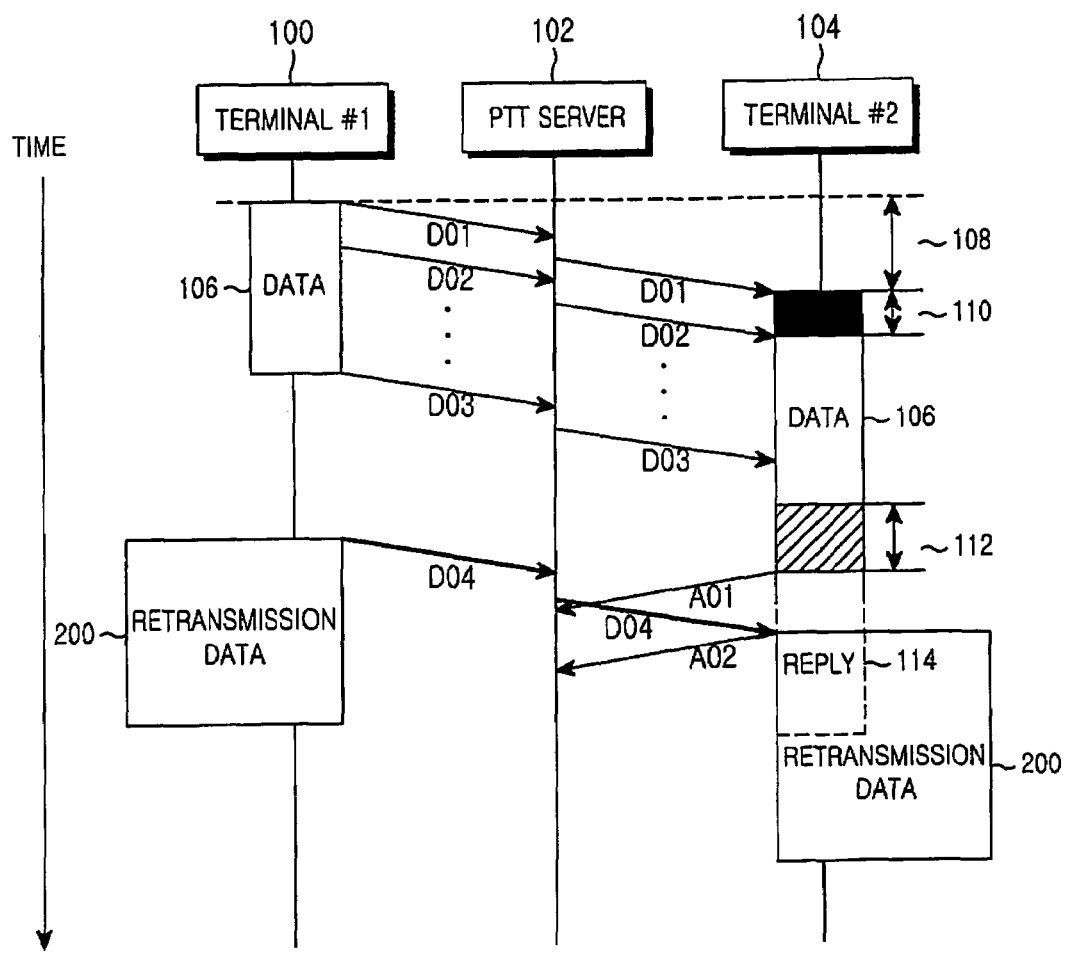
FIG. 2 is a diagram illustrating a signal flow when a reply is cancelled during a PTT call.
Figure 3:
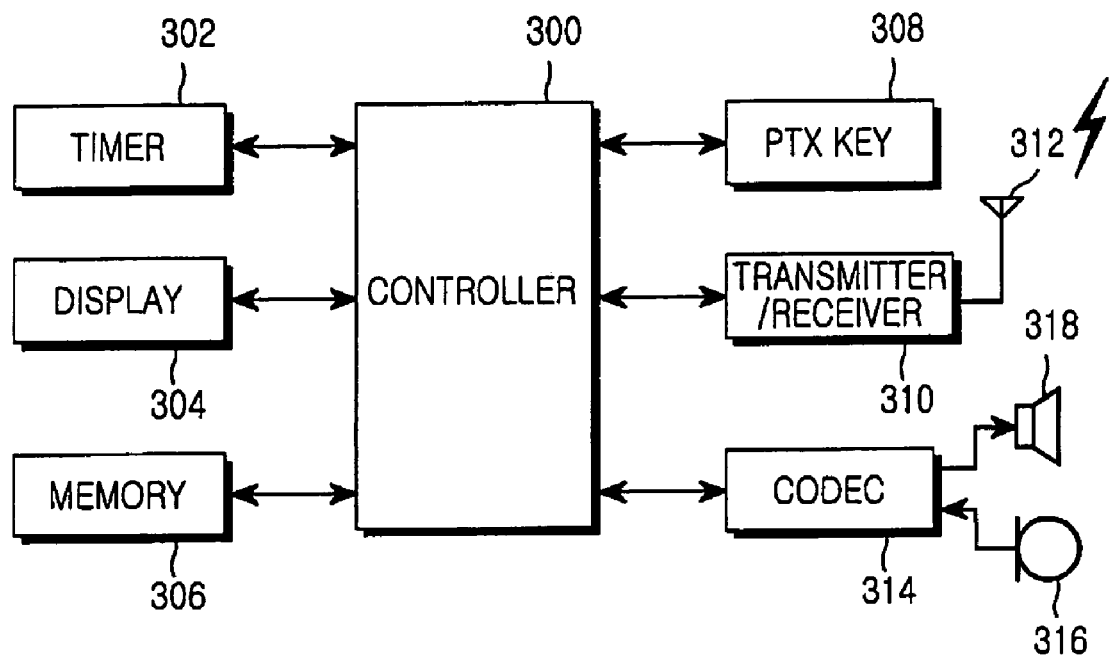
FIG. 3 is a block diagram of an apparatus for displaying a holding time in half-duplex communications according to an embodiment of the present invention.

Referring to FIG. 3, the PTX terminal includes a controller 300, a timer 302, a display 304, a memory 306, a PTX key 308, a transmitter/receiver 310, an antenna 312, a coder-decoder (CODEC) 314, a microphone 316 and a speaker 318.

The controller 300 provides overall control to the PTX terminal. In addition to its basic functions, the controller 300 estimates a reply time delay by controlling the timer 302, computes a holding time for a reply, displays the holding time on the display 304 and counts down the holding time.

The timer 302 counts the transmission time of data, that is, the time for which the PTX key 308 is kept activated, or counts time elapsed until an ACK signal is received for transmitted data, under the control of the controller 300.

The display 304 displays state information or indicators produced during the operation of the PTX terminal, limited digits and characters, moving pictures and still images. A liquid crystal display (LCD) can be used as the display 304.

The memory 306 stores programs needed to control the overall operation of the PTX terminal and temporarily stores data generated during the operation of the PTX terminal.

The PTX key 308 is activated for data transmission when transmission is available, i.e., when the other party is not using a given channel. While the PTX key 308 is kept activated, PTX data is transmitted.

The transmitter/receiver 310 downconverts a radio frequency (RF) signal received through the antenna 312 to a baseband signal and despreads and channel-decodes the baseband signal, during a reception operation. For transmission, it channel-encodes and spreads transmission data, upconverts the baseband signal to an RF signal and transmits the RF signal through the antenna 312.

The CODEC 314 connected to the controller 300 and the microphone 316 and the speaker 318 connected to the CODEC 314 collectively form a voice input/output unit for voice communications. The CODEC 314 converts pulse code modulation (PCM) data received from the controller 300 to an analog voice signal and outputs the analog voice signal through the speaker 318. It also converts a voice signal received through the microphone 316 to PCM data and provides the PCM data to the controller 300.

A method of computing a holding time for half-duplex communications in the PTX terminal having the above-described configuration will be described below with reference to FIGS. 4, 5 and 6.

In a one-on-one half-duplex conversation, a receiving terminal, when receiving data, sends an ACK signal for the data reception after a decoding time delay to a transmitting terminal. Upon receipt of the ACK signal, the transmitting terminal computes a holding time in a different manner depending on whether data transmission has been completed.

Figure 4:
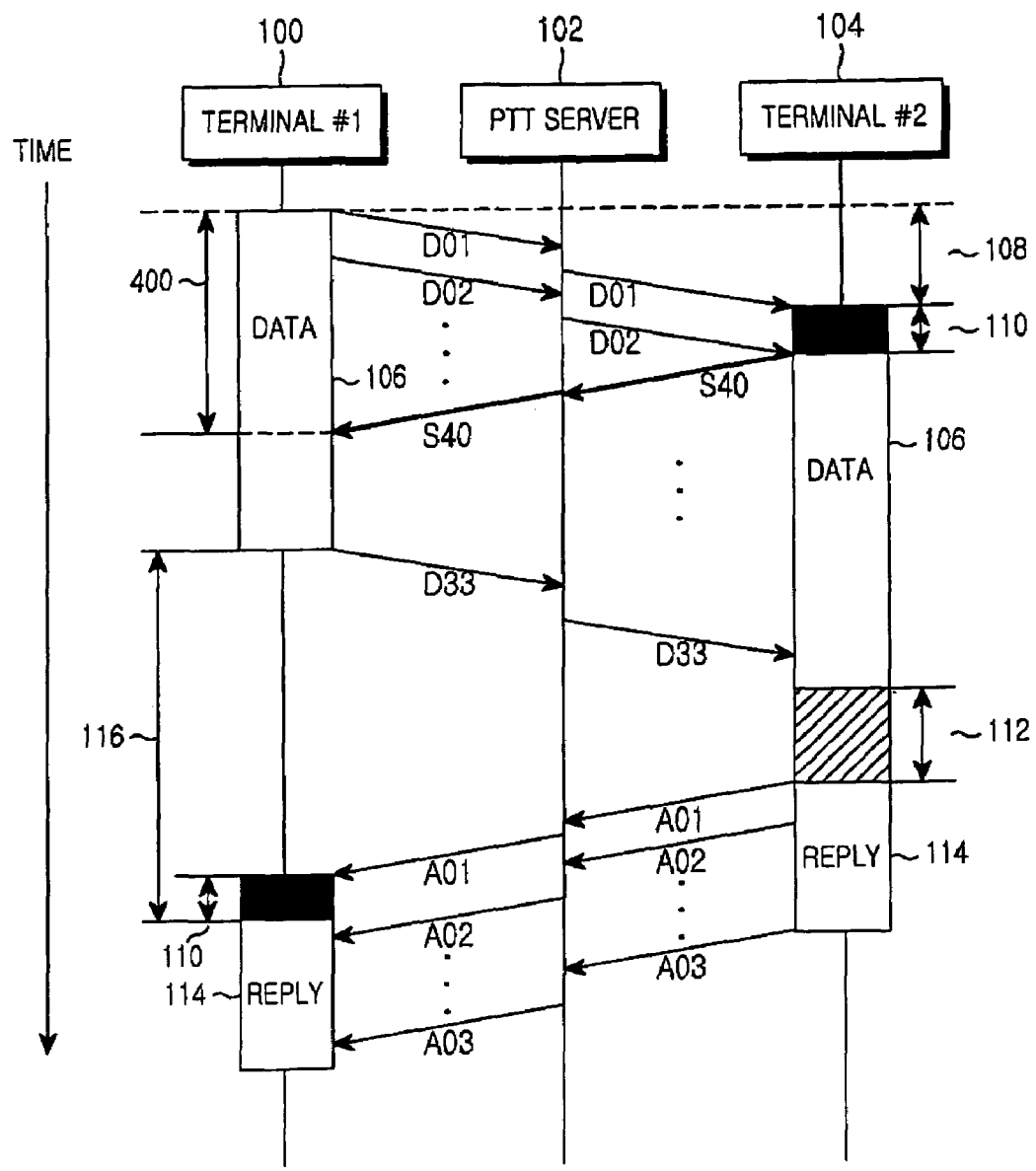
FIG. 4 is a diagram illustrating a signal flow for calculating a holding time when an ACK signal is received before data transmission is completed in half-duplex communications according to an embodiment of the present invention.

FIG. 4 is a diagram illustrating a signal flow for calculating a holding time when an ACK signal is received before data transmission is completed in half-duplex communications according to the present invention.

Referring to FIG. 4, the second terminal 104 sends an ACK signal S40 for reception of the data 106 to the first terminal 100 after the decoding time delay 110.

The first terminal 100 computes time 400 taken from the start of transmission of the data 106 to reception of the ACK signal S40, estimates the reply time delay 112, computes the total holding time 116 by adding the ACK reception time 400 to the estimate of the reply time delay 112 and counts down the total holding time 116 from the end of the data transmission until before reception of the reply 114.

The estimate of the reply time delay 114 is a predetermined time or the average of the previous reply time delays that have occurred since a channel connection.

Figure 5:
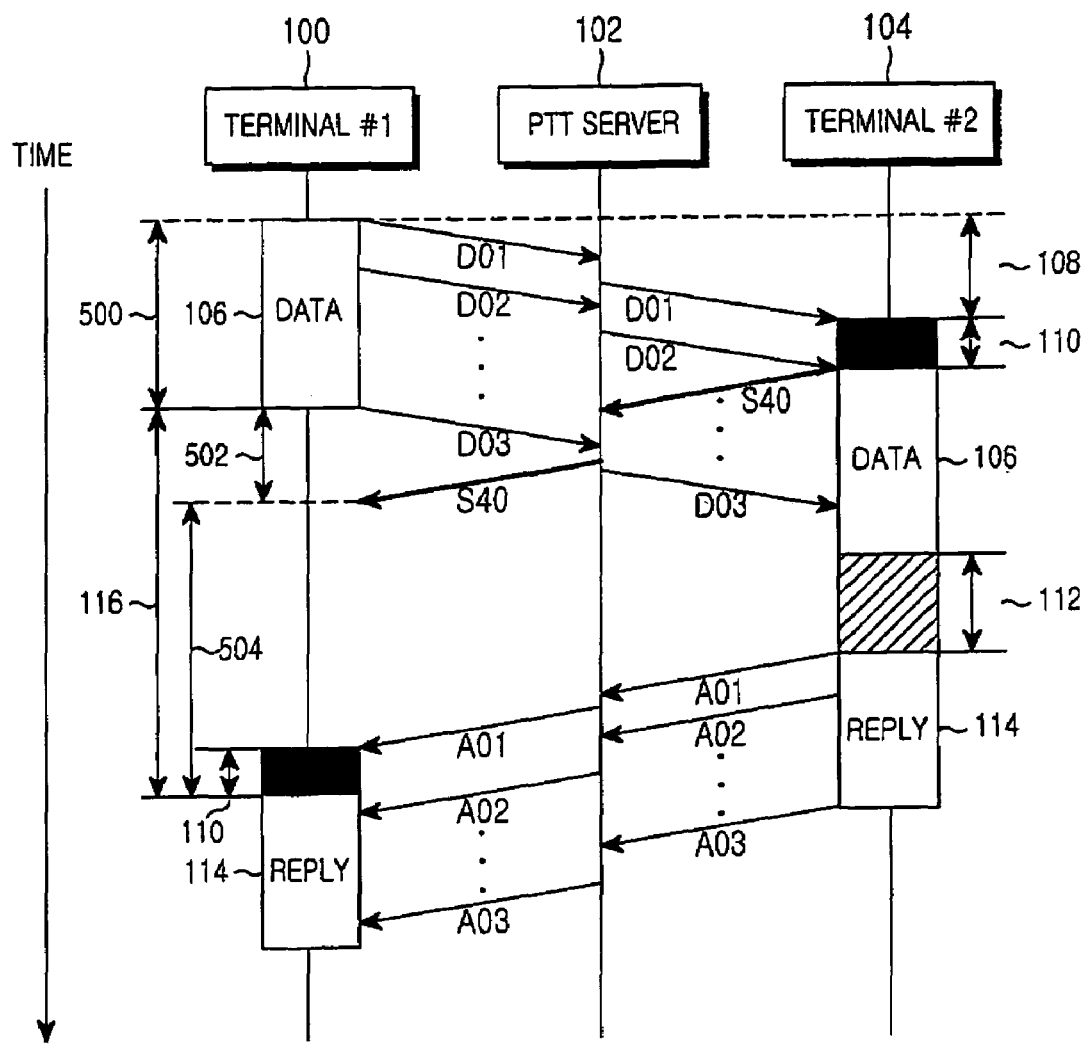
FIG. 5 is a diagram illustrating a signal flow for calculating a holding time when an ACK signal is received after data transmission is completed in half-duplex communications according to an embodiment of the present invention.

FIG. 5 is a diagram illustrating a signal flow for calculating a holding time when an ACK signal is received after data transmission is completed in half-duplex communications according to the present invention.

Referring to FIG. 5, the second terminal 104 sends the ACK signal S40 for reception of the data 106 to the first terminal 100 after the decoding time delay 110.

If the ACK signal S40 is received before the data 106 is completely transmitted, the total holding time 116 is divided into a holding time 502 before reception of the ACK signal S40 and a holding time 504 after reception of the ACK signal S40. Since the holding time 502 cannot be computed, a predetermined message is output to the user of the PTX terminal.

The first terminal 100 computes transmission time 500 taken between the start and end of transmission of the data 106, estimates the reply time delay 112, computes the holding time 504 by adding the data transmission time 500 to the estimate of the reply delay time 112 and counts down the holding time 504 from reception of the ACK signal S40 until before reception of the reply 114.

The estimate of the reply time delay 114 is a predetermined time or the average of the previous reply time delays that have occurred since a channel connection.

Figure 6:
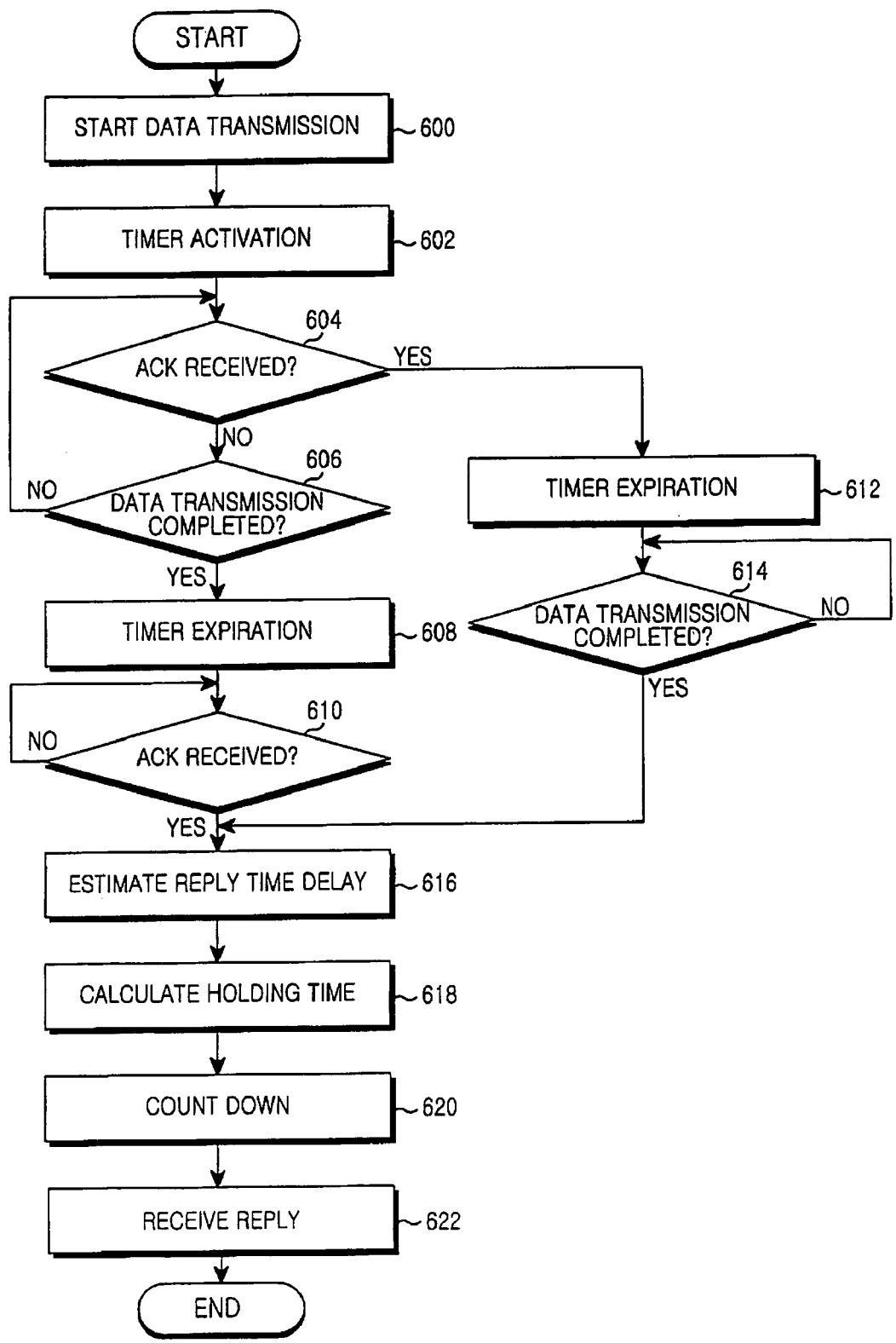
FIG. 6 is a flowchart illustrating a procedure for displaying a holding time in half-duplex communications according to an embodiment of the present invention.

FIG. 6 is a flowchart illustrating a procedure for displaying a holding time in half-duplex communications according to the present invention.

Displaying a holding time can be based on either when data transmission is completed before or after reception of an ACK signal according to the present invention.

In the former case, as data transmission starts in step 600, the timer is activated in step 602 and it is determined whether an ACK signal has been received in step 604.

If the ACK signal has not been received, it is determined whether data transmission has been completed in step 606.

Upon completion of the data transmission, the timer expires in step 608 and it is determined whether the ACK signal has been received in step 610.

Upon receipt of the ACK signal, a reply time delay is estimated in step 616.

In step 618, a holding time for a reply is calculated by adding the count of the timer obtained upon the timer expiration in step 608 to the estimate of the reply time delay computed in step 616.

The holding time is output and counted down in step 620. In step 622, a reply is received and the procedure ends.

When data transmission is completed after reception of an ACK signal, as data transmission starts in step 600, the timer is activated in step 602 and it is determined whether an ACK signal has been received in step 604.

Upon receipt of the ACK signal, the timer expires in step 612 and it is determined whether the data transmission has been completed in step 614.

Upon completion of the data transmission, a reply time delay is estimated in step 616.

In step 618, a holding time for a reply is computed by adding the count of the timer obtained upon the timer expiration to the estimate of the reply time delay computed in step 616.

The holding time is output and counted down in step 620. In step 622, a reply is received and the procedure ends.

As described above, the present invention provides a PTX terminal for displaying a holding time for a reply and a communication method therefor. The PTX terminal includes a transmitter/receiver for transmitting/receiving data and an ACK signal, a PTX key for activating data transmission/reception, a timer for counting time upon pressing of the PTX key, a display for displaying a total holding time, and a controller for controlling calculation of the total holding time based on the time count, displaying and counting down of the total holding time. Since the holding time can be estimated, frequency and packets which might otherwise be dissipated by unnecessary data retransmission, are saved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A half-duplex terminal for displaying a holding time for reception of a reply at the half duplex terminal, comprising:
   a transmitter/receiver for transmitting/receiving data and an acknowledgement (ACK) signal;
   a push-to-X (PTX) key for activating data transmission/reception;
   a timer for counting time upon pressing of the PTX key;
   a display for displaying the holding time for reception of the reply; and
   a controller for controlling calculation of the holding time based on the count of the timer, and display and counting down of the holding time;
   wherein if the ACK signal is received before completion of the data transmission, the holding time is a sum of an ACK reception time and a reply time delay, and if the data transmission is completed before reception of the ACK signal, the holding time is a sum of data transmission time and the reply time delay.

2. The half-duplex terminal of claim 1, wherein the timer starts to count time upon pressing of the PTX key and expires upon receipt of the ACK signal before the data transmission is completed, thereby measuring an ACK reception time, or the timer starts to count time upon pressing of the PTX key and expires upon completion of the data transmission before the ACK is received, thereby measuring a data transmission time.

3. The half-duplex terminal of claim 1, wherein the reply time delay is a predetermined time or the average of previous reply time delays.

4. A method of displaying a holding time for reception of a reply in a half-duplex terminal, comprising the steps of:
   (1) counting time when data transmission starts;
   (2) determining whether an acknowledgement (ACK) signal has been received;
   (3) ending the time counting upon receipt of the ACK signal;
   (4) completing the data transmission;
   (5) calculating the holding time for reception of the reply in a controller of the half-duplex terminal and
   (6) counting down the holding time for reception of the reply in the controller of the half-duplex terminal;
   wherein calculating the holding time in step (5) is performed by adding ACK reception time to a reply time delay if the ACK signal is received before completion of the data transmission, and calculating the holding time by adding data transmission time to the reply time delay if the data transmission is completed before reception of the ACK signal.

5. The method of claim 4, further comprising, between steps (2) and (5), the steps of:
   determining whether the data transmission has been completed if the ACK signal has not been received;
   returning to step of (2) if the data transmission has not been completed, and ending the time counting if the data transmission has been completed; and
   receiving the ACK signal.

6. The method of claim 4 wherein the reply time delay is a predetermined time or the average of previous reply time delays.

* * * * *

UNITED STATES PATENT AND TRADEMARK OFFICE
CERTIFICATE OF CORRECTION

PATENT NO.       : 7,643,437 B2                                          Page 1 of 1
APPLICATION NO.  : 11/356623
DATED            : January 5, 2010
INVENTOR(S)      : Byoung-Chul Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-first Day of December, 2010

David J. Kappos
*Director of the United States Patent and Trademark Office*